United States Patent [19]

Pierick

[11] 4,384,513
[45] May 24, 1983

[54] APPARATUS FOR PREPARING PIZZA IN A BAKING OVEN

[76] Inventor: Richard L. Pierick, 3256 Hampshire Ave., N., Minneapolis, Minn. 55427

[21] Appl. No.: 261,511

[22] Filed: May 7, 1981

[51] Int. Cl.³ .............................................. A47J 37/06
[52] U.S. Cl. .............................. 99/400; 99/DIG. 15; 99/401; 99/446; 99/447; 126/275 R; D7/359
[58] Field of Search ................. 99/446, 447, DIG. 15, 99/400, 401; 426/523; 126/21 R, 275 R; D7/85, 96, 129

[56] References Cited

U.S. PATENT DOCUMENTS

| | | | |
|---|---|---|---|
| 1,316,365 | 9/1919 | Jackson | 99/450 |
| 1,512,482 | 10/1924 | Patterson | 219/368 |
| 1,862,420 | 6/1932 | O'Brien | 99/447 X |
| 1,956,387 | 4/1934 | Hartman | 99/446 |
| 2,456,988 | 12/1948 | Pierson | 99/446 |
| 2,742,850 | 4/1956 | LaFond | 99/446 |
| 3,040,651 | 6/1962 | Nolte | 99/446 |
| 3,088,393 | 5/1963 | Huckabee | 99/340 |
| 3,292,528 | 12/1966 | Myler | 99/446 |
| 3,301,172 | 1/1967 | Haro | 99/446 |
| 3,347,181 | 10/1967 | Pizzo | 99/450 X |
| 3,623,423 | 11/1971 | Berger | 99/446 |
| 3,704,142 | 11/1972 | Wilson | 99/446 |
| 3,745,912 | 7/1973 | Field | 99/446 |
| 3,793,936 | 2/1974 | Wills | 99/450 X |
| 3,847,069 | 11/1974 | Guibert | 99/443 R |
| 3,972,318 | 8/1976 | Lenoir | 99/446 X |
| 4,184,421 | 1/1980 | Ahlgren | 99/450 |

FOREIGN PATENT DOCUMENTS

| | | | |
|---|---|---|---|
| 537638 | 11/1931 | Fed. Rep. of Germany | 99/447 |
| 225971 | 5/1943 | Switzerland | 99/447 |

Primary Examiner—Billy J. Wilhite
Attorney, Agent, or Firm—James V. Harmon

[57] ABSTRACT

A device is provided for uniformly heating chilled pizza within an oven by supporting the pizza in a horizontal position, directing a stream of hot air upwardly onto the center of the pizza while shielding its periphery from radiation emanating from the oven heat source. An oven appliance is provided including a grill composed of openwork for supporting the pizza and a base spaced below the grill and composed of a baffle having a central vent opening for funneling a stream of hot air upwardly onto the middle of the lower surface of the pizza. The baffle also acts as a shield interposed between the infrared radiating heat source and the periphery of the pizza.

7 Claims, 12 Drawing Figures

APPARATUS FOR PREPARING PIZZA IN A BAKING OVEN

FIELD OF THE INVENTION

The invention relates to food preparation and more particularly to an apparatus for heating fresh or frozen foods in a baking oven.

THE PRIOR ART

It is common knowledge that pizzas have become an extremely popular American food. Whether freshly prepared or frozen, the pizza prior to serving is placed on an oven rack and is allowed to cook by the normal operation of the oven. The pizza is thus cooked by both radiation and convection. However, there is not much air movement within a conventional oven. An important deficiency in cooking a pizza in this manner is that the outer edge tends to be overdone while the center may remain relatively cool and underdone. In an extreme situation, the outer edge becomes scorched or burned while the center remains cool. Another problem is liquid dripping from the pizza during the cooking operation which collects in the oven. Attempts have been made to provide various kinds of cooking sheets for food products such as pizza but they do not provide the advantages of uniform heating, durability and adaptation to pizzas of different sizes. At present pizzas are commonly available at the grocery store in 8", 10", and 11¼" diameter sizes.

One of the problems that occurred in developing the present invention was the provision of a unit that is adaptable to different sizes of pizzas commonly sold. A further problem is the provision of a unit that is very compact for shipping particularly with respect to its height but which would, at the same time, support the pizza a substantial distance above the base of the unit to achieve the required performance characteristics. A further problem is the provision of an appliance that can be cleaned easily and in which parts can be separated for ease of cleaning.

OBJECTS

In view of these and other deficiencies of the Prior Art, it is an object of the present invention to provide an improved apparatus heating pizza in an oven and an oven appliance for carrying out the heating operation with the following characteristics and advantages:

(a) The provision of an effective means for heating pizza in an oven such as a baking oven of the kind commonly found in the home that will heat a pizza uniformly and without either burning the edge or allowing the center section to remain cold.

(b) The provision of a method of heating pizza that will provide more color uniformity so that all portions of the pizza appear evenly and uniformly browned following heating.

(c) A provision for shielding portions of the pizza and at the same time catching drippings that would otherwise fall into the oven.

(d) The provision of an oven appliance for heating pizza that is adaptable to pizzas of different sizes commonly available at retail outlets.

(e) The provision of an oven appliance for heating pizza that is collapsible for sale and shipment to a relatively small size but which can be expanded vertically to support the pizza in spaced relationship from the base of the appliance.

(f) The provision of an oven appliance for heating pizza that is rugged in construction, can be manufactured at low cost, is simple to use and can be easily cleaned.

(g) The provision of an appliance of the type described having a base comprising an air baffle with a vent opening near the center and removable members of very low overall height for effectively changing the size of the vent openings to accommodate different size pizzas.

(h) An effective provision for uniformly heating pizzas of different sizes by controlling the impact area of an impinging hot air stream.

THE FIGURES

SUMMARY OF THE INVENTION

A device is provided for uniformly heating fresh or frozen pizza within an oven by supporting the pizza in a horizontal position, directing a stream of hot air upwardly onto the center of the pizza to reduce the adhered boundary air layer preferably while also shielding its periphery from radiaton emanating from the oven heat source. An oven appliance is provided including a grill composed of openwork for supporting the pizza and a base spaced below the grill and composed of a baffle having a central vent opening for funneling a stream of hot air upwardly onto the middle of the lower surface of the pizza. The baffle also acts as a shield interposed between the infrared radiating heat source and the periphery of the pizza.

More specifically, in accordance with the method of the present invention, a baking oven such as a domestic oven is used. The heat source within the oven is energized preferably to preheat the oven before heating the pizza, e.g. 400° F. to 450° F. for 10 minutes. The pizza is supported in a horizontal plane within the oven of the type having a heat source at the bottom thereof. The pizza is supported throughout its entire width and breadth at a point in the oven above the heat source while the entire lower surface of the pizza has free access to the air moving within the oven. The peripheral edge portion of the pizza is shielded from direct exposure to infrared radiation from the heat source located below it. At least part of the air rising upwardly from the heat source within the oven is ducted toward the center of the pizza while the pizza is located over the middle of the ducted air column. This provides a rising column of hot air smaller in diameter than the diameter of the pizza which impinges against the lower surface of the pizza at substantially its center to disrupt the adhered boundary layer air on the lower surface, next spreading radially outwardly in a horizontal plane across the lower surface of the pizza and flowing upwardly around the shielded peripheral edge thereof toward the top of the oven. In this way the pizza is cooked uniformly without either the presence of an underdone center or an overly cooked peripheral edge.

DETAILED DESCRIPTION

Figures 1, 2:
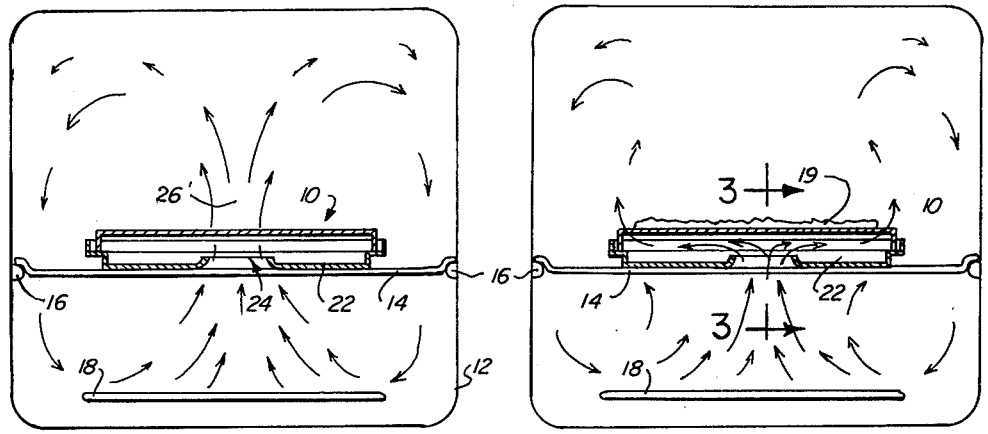
FIG. 1 is an elevational view of an oven appliance as it appears within the oven before use.
FIG. 2 is a view of similar FIG. 1 as the appliance appears after the pizza has been put in place for heating.
Figure 3:
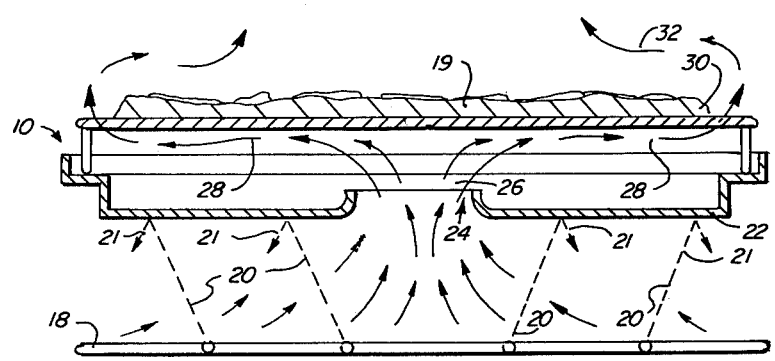
FIG. 3 is a diagrammatic side elevational view partly in section illustrating the principle of operation taken on line 3—3 of FIG. 2.

Refer now to FIGS. 1 through 3 which illustrate the principle of operation of the invention.

As seen in FIGS. 1 and 2 an oven appliance 10 is provided in accordance with the present invention. During operation the appliance 10 is placed in an oven 12 such as an ordinary domestic baking oven on an existing oven rack 14 supported by lugs 16. At the bottom of the oven is provided a heat source 18 which ordinarily comprises either a gas burner or an electrical resistance heater that radiates infrared radiation as indicated diagrammatically by dotted lines 20.

In accordance with the present invention, a pizza 19 is heated uniformly by placing the pizza in a horizontal position and supporting it throughout its entire width and breadth at a point within the oven above the heat source 18. The lower surface of the pizza is exposed to free access by air currents moving within the oven. Located below the pizza is a base comprising a baffle 22 composed of a circular section of sheet metal which also serves as a means for shielding the peripheral edge of the pizza from direct exposure to infrared radiation coming from heat source 18 located below it. Within the center of the base or the baffle 22 is a vent opening 24 for funneling hot air upwardly from the heat source as a column indicated at 26 toward the middle of the pizza while the pizza is centered over the ducted air to thereby provide a fast rising column of hot air smaller in diameter than the pizza itself. This rising column of air impinges against the lower surface of the pizza at substantially its center to disrupt the adhered boundary layer air on the lower surface. The hot air then spreads radially outward as shown by arrows indicated at 28 in a horizontal plane across the lower surface of the pizza and then flows upwardly around the shielded peripheral edge 30 along flow lines indicated at 32. In this way at least the periphery of the pizza is heated almost entirely by hot air and without burning its edges or underheating the center. Because the base 22 has upwardly turned edges at the periphery and around opening 24, it will also serve as a catch pan to collect drippings from the pizza.

By reference to FIG. 1 it will be noted that the ducted column of hot air passing upwardly through the opening 24 in the base 22 rises as indicated by the flow lines 26 and flows upwardly all the way to the top of the oven. In this instance the air flows solely through free convection produced by differences in air density resulting from temperature changes. However, during operation the rising column of air strikes the bottom surface of the pizza 19 at its center and with sufficient force to disrupt and reduce the adhered boundary layer air at that point. While the theory of operation of the present invention is not known with certainty, it is believed that the disruption of the boundary layer air facilitated by the impingement of the rising column 26 striking the lower surface of the pizza is effective in accelerating the heating at that point and thereby balancing the heating effectively between the center and the peripheral edge 30. It is also important however to note that the peripheral edge 30 of the pizza is protected from direct infrared radiation emanating from the heat source 18 by the action of the base 22 which functions as a shield for reflecting the infrared radiation back toward the bottom of the oven as shown at 21 in FIG. 3.

Summarizing the method of operation as understood, it is applicant's belief that the adhered boundary air layer which normally exists on the bottom surface of the pizza 19 is disrupted and removed by the impacting column 26 of rising air passing through aperture 24, and it is this combination of the removal of the boundary layer together with the shielding of the periphery of the pizza which produces the desired uniform heating. By contrast, if the pizza is laid directly on the oven rack 14 without the use of the invention, the center of the pizza will remain relatively cool after a fairly long period of heating owing to the existence of the dead air spot near the center. It is well known that the resistance to heat flow across the boundary layer, e.g. a wall surrounded by hot air is affected substantially by the adhered boundary air layer. This air film factor or f value for a vertical wall will be about 0.68. For a top wall the value will be about 0.92 while on a bottom wall it will be about 0.61 and when an air stream strikes the surface at 570 ft./min. it drops to 0.25. It was discovered that during operation, the impact of the rising hot air column 26 provided by funneling air through a vent opening is apparently sufficient to break down this boundary layer air as it strikes the bottom surface of the pizza and then travels radially outward but upon reaching the periphery is cool enough so that it does not burn the edge.

While the dimensions of the appliance and the distance between components are not utterly critical to the success of the invention, optimum performance is affected by these parameters. For example, in the case of a typical frozen pizza freshly removed from the freezer at a temperature of about 0° F. and placed in a 400° F. oven an inch or two above the baffle 22, the ratio of the diameter of the vent opening 24 to the pizza diameter should be from about ½ to 4/5 and most preferably from about 0.6 to about 0.75 for best results. These parameters apply to each size of two or more removable rings so that the largest size opening is used with the largest size pizza, and the smallest opening is used with the smallest pizza. Again assuming the pizza is placed on the appliance of the invention in a frozen condition and the oven is set at 400° F. with the pizza spaced 1½" above the baffle 22, the following dimensions apply:

For an 8" pizza, opening 24 should be 5¼"; for a 10" pizza, 7¼" ; and for an 11½" pizza, 8½". These opening sizes are typical but optimum values will vary depending upon oven construction and temperature as well as the physical characteristics and temperature of the pizza, etc. The higher the pizza is raised above the baffle, the smaller the vent opening 24 must be made to obtain optimum results. This relationship will be described more fully below.

Figure 4:
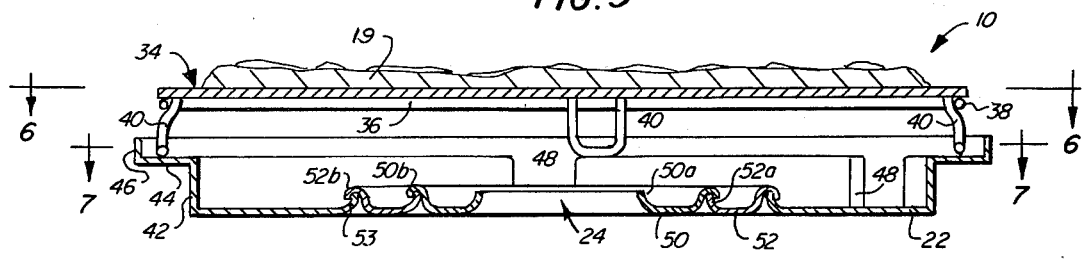
FIG. 4 is a vertical sectional view of another embodiment of the invention.
Figure 5:
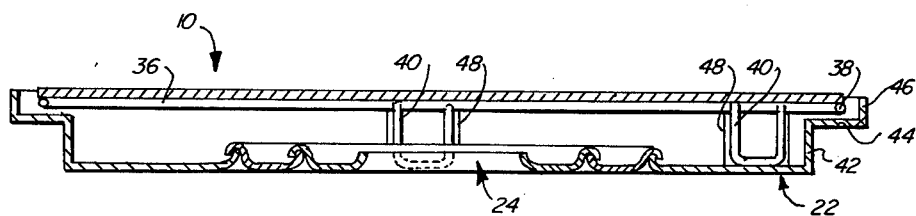
FIG. 5 is a view similar to FIG. 4 with the grill nested into the base for shipment.
Figure 6:
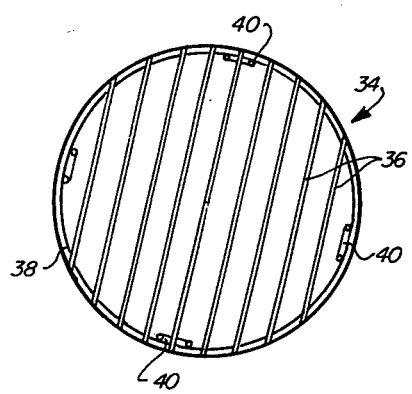
FIG. 6 is a plan view of the grill taken on line 6—6 of FIG. 4 on a reduced scale.
Figure 7:
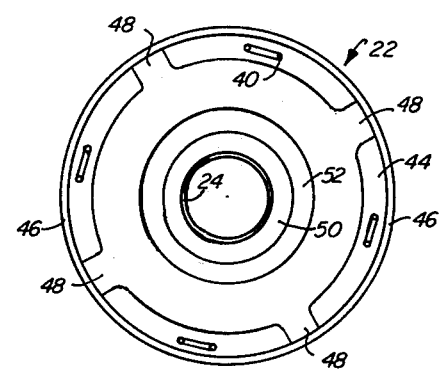
FIG. 7 is a transverse view taken on line 7—7 of FIG. 4 on a reduced scale.

Refer now to FIGS. 4 through 7 which illustrate a preferred form of oven appliance in accordance with the present invention. As seen in the figures, the pizza 19 is supported throughout its entire width and breadth in a horizontal position on a grill 34 which in this instance is circular. The grill comprises an openwork of any suitable construction such as parallel metal rods 36 welded at their ends to a ring-shaped rod 38 which is supported from the base 22 by U-shaped metal rods welded at their upper ends to the ring 38 and extending downwardly at a substantially vertical position to define legs 40 for supporting the grill 34 from the base 22. The height of the legs can be about an inch or an inch and a quarter and the grill should have a diameter larger than the diameter of the largest size pizza to be heated. The base 22 can be formed from a circular piece of sheet metal having an upwardly extending circular side wall 42 with a horizontally disposed leg support ledge 44 at its upper edge. Extending upwardly from the ledge 44 is a circular flange 46 that prevents the legs and the grill 34 from sliding off the base 22. In order to collapse the appliance from the operating condition shown in FIG. 4 (wherein grill 34 is spaced substantially from the base 22), there are provided a plurality of leg-receiving recesses 48, which equal the number of legs 40 and are of the proper size and circumferential spacing to receive all the legs 40 at once so that the appliance 10 can be collapsed for storage as shown in FIG. 5 simply by placing the legs 40 within the recesses 48. This reduces the height of the appliance to the height of the base 40. However, when the appliance is to be used, the grill is raised and the legs placed on the leg supporting ledge 44. It can thus be seen that the legs coact with the recesses 48 to define a means for adjusting the vertical height of the grill 34 above the base 22 and its central vent opening 24. As it can be seen in FIGS. 4, 5 and 7, the central part of the base or baffle 22 comprises two concentric removable rings 50 and 52 each having an upwardly turned central nozzle 50a and 52a. At the outer edge of each of the rings 50 and 52 is a downwardly turned lip 50b and 52b respectively. The downwardly turned lip 52b of ring 52 engages the upwardly turned edge of a circular flange 53 which serves as a nozzle for the vent opening of the largest size pizza. When a smaller size is to be cooked, one or both of the circular rings are placed in position as shown in FIGS. 4 and 5. While dimensions are not utterly critical; in a typical application, the diameter of the vent opening 24 in the ring 50 is about 5¼", the vent opening defined by flange 52a is 7¼" and the opening 53 has a diameter of about 8⅛". It can be seen that by providing upwardly turned central flanges 53, 50a and 52a together with downwardly turned outer peripheral lips 50b and 52b that the overall height of the base 22 and the rings 50 and 52 is kept very low.

Figure 8:
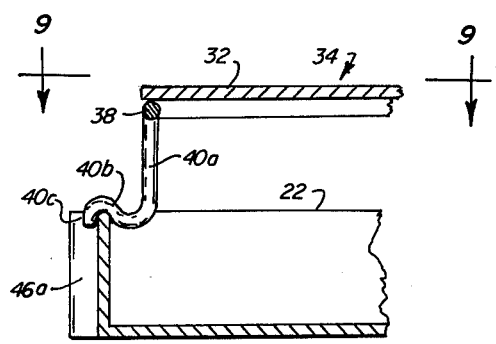
FIG. 8 illustrates a modified form of the invention wherein a different kind of height adjustment is provided for supporting the grill above the base.
Figure 9:
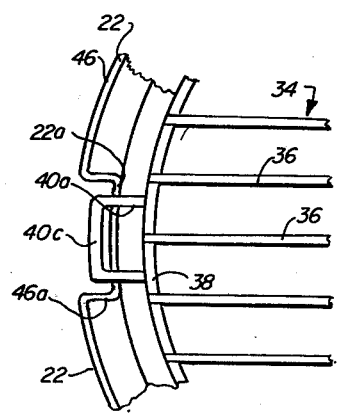
FIG. 9 is a plan view of FIG. 8.

Refer now to FIGS. 8 and 9 which illustrate another form of the invention.

As seen in the figures, the grill 34 is provided with legs 40a each comprising a U-shaped downwardly extending leg having its free upper ends welded or otherwise secured to the ring member 38 of the grill 34. The lower edge of the leg 40a bends upwardly at 40b and includes a downwardly directed hook 40c adapted to engage the upper free edge 22a of the base 22 at a point where there is a centrally-extending offset section 46a in the sidewall 46, one such offset 46a being provided for each of the legs 40a. It can thus be seen that when the grill 34 is to be elevated the legs are placed as shown on the top edge 22a of offset section 46. On the other hand when the oven appliance is to be collapsed, the grill 34 is rotated on its own center and the legs 40a lowered until they contact the bottom wall of the base 22. This illustrates another way in which the legs can be used to cooperate with the base to provide a means for changing the elevation of the grill above the base or baffle 22.

Figure 10:
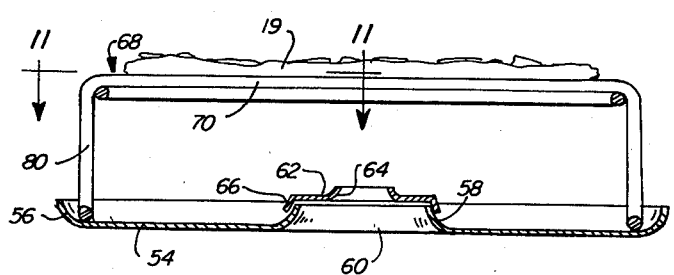
FIG. 10 is a vertical sectional view of another embodiment of the invention.
Figure 11:
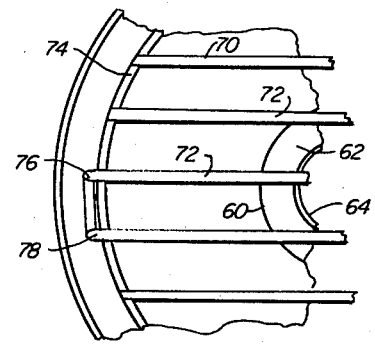
FIG. 11 is a horizontal view taken on line 11—11 of FIG. 10.

Refer now to FIGS. 10 and 11 which show another embodiment of the invention. As seen in the figures, the base 54 comprises a circular sheet metal baffle which functions during operation to guide hot air within the oven toward the center vent opening to be described below. In this case the baffle 54 includes a short upwardly turned peripheral flange 56 at its outer edge and a similar flange 58 at its inner edge that defines a nozzle for the central vent opening 60. The height of the flanges 56 and 58 may be about ¼". Mounted on top of the flange 58 is a removable air flow control ring 62 having a central vent opening 64 and a downwardly turned peripheral flange 66 to keep the ring 62 centered on the flange 58. Resting on top of the base or baffle 54 is a grill 68 comprising an openwork 70 made up of bars or rods 72 welded at their outer edge to circular bar 74. Some of the bars 72 bend downwardly at 76 and 78 to define legs 80 resting on the upper surface of the base 54. It will be seen in this case that the height of the appliance is not adjustable and that the baffle 54 does not have a vertically extending sidewall of substantial height. This embodiment of the invention is simpler in construction but has the disadvantage of not being collapsible for shipment. As before, the baffle 54 serves as a screen for reflecting radiation from the burner away from the periphery of the pizza. The base also serves to collect drippings as in the previous embodiments and in this way helps to keep the oven clean.

Figure 12:
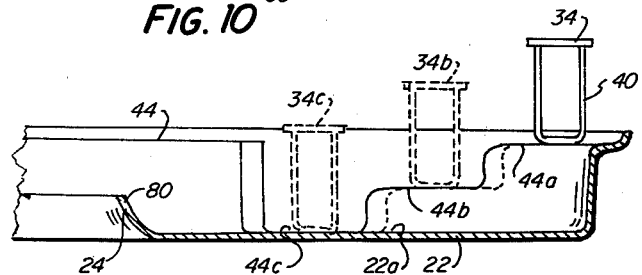
FIG. 12 is a partial vertical sectional view of another embodiment of the invention.

Refer now to FIG. 12 which shows another embodiment of the invention wherein the same numbers refer to corresponding parts in the several views. In this case the base 22 includes a central opening 24 surrounded by an upwardly turned flange 80. In this case the diameter of the central vent opening 24 cannot be changed. Instead, the grill 34, only part of which is shown, is adjustable in height by providing a stepped ledge 44. The stepped ledge 44 has three different elevations or steps comprising horizontal ledge sections 44a, 44b and 44c, each at a different elevation above the flat circular baffle section 22a of the base 22. Four such stepped ledges are provided, one for each of the legs 40, and each is spaced circumferentially the proper distance apart to accommodate one of the legs. Thus when each of the legs is placed at the lowest elevation 44c the grill will be at its minimum height, when placed at step 44b the grill will have an intermediate height, and when placed at step section 44a the grill 34 will be raised to its maximum height. During experimental work leading to the development of the present invention it was discovered that by raising the grill further from the baffle and the vent opening 24, the rising column of air ducted through the vent opening, even though of constant size, can be made to function effectively for different size pizzas. Thus, for the pizza of the largest size the grill 34 is raised to its maximum height. For medium size pizzas it is lowered to the step 44b and for pizzas of the smallest size the grill is lowered all the way to dotted line position 34c corresponding with the step elevation 44c. In this way the invention can be made to function effectively for pizzas of different sizes without the use of the rings 50 and 52.

It will be seen that the invention provides a number of important advantages. The uniformity of cooking or heating is the most important of these. In addition the base 22 will catch the drippings from the pizza and help to keep the oven clean. To facilitate cleaning the upper surface of the base 22 can be coated with a release substance such as polytetraflouroethylene. For best results it is important to center the grill 34 on the base 22 and the peripheral ledge 46 or 56 as the case may be will accomplish this purpose. As mentioned in connection with FIG. 12, the height of the grill above the circular baffle containing the vent opening is important with respect to the diameter of the vent opening itself for pizzas of the same size, and for pizzas of different size it was discovered that the height could be changed to provide the proper amount of uniform heating from the rising column of air to maintain heating uniform throughout the pizza.

A number of variations can be made. For example, the grill can be made without legs and rest directly on the upper edge of the sidewall 42 of the pan 22. The grill can comprise any kind of openwork such as punched sheet metal, woven metal or screen. The important thing is to expose the entire lower surface of the pizza to free access to the air moving within the oven. The vent opening 24 at the center of the baffle 22 may be made with an upstanding flange or not as desired. When an upwardly extending flange such as the flange 53 (FIG. 4) is used, the hole may be made smaller than it would be without a flange.

The appliance may be made of various materials but one preferred material for the base comprises a 20 to 28 gauge aluminum or stainless steel with a Teflon coating on it upper surface. The grill can be made of chrome plated steel rod having a diameter of about 3/32". During use the cooking time will of course be adjusted for the desired results in the particular oven being used. It has been found, however, that the cooking time should be about the same or slightly longer than the recommended cooking time for a pizza that is cooked directly on an oven rack. If a lightweight gauge base is used having a gauge, say, of about 0.020 or 0.015" in thickness, the cooking times can be about the same as for a pizza cooked directly on an oven rack.

To account for variations in heating and cooking between gas and electric ovens, the rings 50 and 52 of FIGS. 4 and 5 can be used together with a provision for moving the grill 34 and pizza 19 up or down preselected distances with respect to the vent opening. This can be accomplished by providing steps as in FIG. 12 as well as removable rings 50 and 52.

It will be seen that the upwardly extending flange 50a, 53, or 58 will function as a venturi located in the center of the base to help guide and confine the flow of the upwardly rising hot air that is caught by the baffle 22. The provision of a radius of curvature at the intersection between this flange and the flat baffle helps the rising hot air make a smooth transition from beneath the baffle upwardly into the rising air column that strikes the center of the pizza.

What is claimed is:

1. An oven appliance for heating pizza comprising a base including a baffle with a vent opening having a diameter between about one-half and four-fifths the diameter of the pizza, a grill mounted upon the base in a position to center a pizza thereon directly over the vent opening in the baffle, the grill having openings therein to allow air to flow freely across the lower surface of the pizza and said grill supporting the pizza throughout its width and breadth, said grill comprising elongated members sufficient in number and spacing to provide support for the pizza at its center and to prevent any portion from sagging, said baffle defining shield means surrounding the vent opening and positioned below the grill to shield the peripheral edge of the pizza from infrared radiation arising from beneath the shield, said grill being unobstructed at its periphery so that hot air is free to flow upwardly at its outer edge around the periphery of the pizza whereby hot air arising through the vent opening will strike the center of the lower surface of the pizza and the pizza will be heated uniformly thereby.

2. An oven appliance for heating a pizza within a baking oven comprising a base including a flat horizontally disposed baffle composed of sheet material and having a vent opening in the center thereof, a grill mounted upon the base in spaced relationship thereabove and in a position to center the pizza thereon directly over the vent opening in the base, the grill having openings therein distributed uniformly thereacross to allow air to flow freely across the lower surface of the pizza and to uniformly support the pizza throughout its width and breadth, said baffle also serving as a shield member surrounding the vent opening and being located below the outer edge of the grill to shield the peripheral edge of the pizza from infrared radiation arising from beneath the shield, both a peripheral edge around the baffle and the edge of the vent opening being turned upwardly whereby the baffle serves as a catch pan for collecting drippings, grill support surface means on said baffle for holding the grill in place on the baffle, and means for shifting the grill toward or away from the baffle to selected positions whereby the spacing therebetween can be changed.

3. The appliance of claim 2 wherein one or more concentric rings formed from sheet material are placed concentrically within the vent opening and supported by the edge thereof for changing the crossectional dimension of said vent opening to provide a rising column of hot air with a crossectional dimension that is a selected fraction of the distance across a pizza of any selected size.

4. The appliance of claim 2 wherein the grill has legs and an equal number of stepped leg support ledges are distributed circumferentially around the edge of the baffle for holding the grill at different selected elevations above the vent opening.

5. An oven appliance for heating pizza comprising a base including a baffle formed from a sheet of material adapted to be placed in a horizontal position within said oven, said baffle having a vent opening, said appliance having a peripheral edge around the outside thereof and said vent opening being spaced centrally from the peripheral edge, said vent opening having a smaller crossectional dimension than the diameter of the pizza to be heated, a raised support ledge around the periphery of the baffle and a vertically extending circular side wall extending downwardly from the inside edge of the support ledge, a circular flange extending upwardly from the ledge around the periphery of the baffle, a grill mounted above the base in position to center the pizza directly over the vent opening in the baffle, the grill having openings therein to allow air to flow freely across the lower surface of the pizza, said grill having base engaging members thereon and adapted to rest on the support ledge, said circular flange preventing the members of the grill engaged on the ledge from sliding off the base when the grill is in use, said grill having grill members therein spaced with sufficient uniformity and close enough to one another to provide uniform support for the pizza and prevent portions thereof from sagging when the pizza becomes hot, the baffle defining a shield means surrounding the vent opening and positioned below the grill to shield the peripheral edge of the pizza from infrared radiation arising from beneath the shield, the baffle being deflected upwardly around the vent to provide an upwardly turned central flange at the vent opening and at least one removable circular ring having a hole therein of predetermined crossection and a downwardly turned peripheral lip at the outer edge of the ring adapted to be engaged over the central flange of the baffle and the hole in the ring and the vent opening being between about one-half and four-fifths times the diameter of a pizza of predetermined size whereby hot air rising through the vent opening or hole will strike the center of the lower surface of the pizza to heat it uniformly.

6. An oven appliance for heating pizza comprising a base including a baffle formed from a sheet of material adapted to be placed in a horizontal position within said oven, said baffle having a vent opening, said appliance having a peripheral edge around the outside thereof and said vent opening being spaced centrally from the peripheral edge, said vent opening having a smaller crossectional dimension than the diameter of the pizza to be heated, a raised support ledge around the periphery of the baffle and a vertically extending circular side wall extending downwardly from the inside edge of the support ledge, a grill mounted above the base in position to center the pizza directly over the vent opening in the baffle, the grill having openings therein to allow air to flow freely across the lower surface of the pizza, a plurality of circumferentially distributed downwardly extending legs rigidly connected to the grill at the periphery thereof and being engagable with the raised support ledge to hold the grill in vertical spaced relationship above the base with predetermined spacing therebetween and means on the base engagable with the legs for holding the grill in position thereon to thereby prevent the grill from sliding off the base, said grill having grill members therein spaced with sufficient uniformity and close enough to one another to provide uniform support for the pizza and prevent portions thereof from sagging when the pizza becomes hot, the baffle defining a shield means surrounding the vent opening and positioned below the grill to shield the peripheral edge of the pizza from infrared radiation arising from beneath the shield, the baffle being deflected upwardly around the vent to provide an upwardly turned central flange at the vent opening and at least one removable circular ring having a hole therein of predetermined crossection and a downwardly turned peripheral lip at the outer edge of the ring adapted to be engaged over the central flange of the baffle and the hole in the ring and the vent opening being between about one-half and four-fifths times the diameter of a pizza of predetermined size whereby hot air rising through the vent opening or hole will strike the center of the lower surface of the pizza to heat it uniformly.

7. An oven appliance for heating a pizza having a flat body comprising a base including a baffle formed from a sheet of material adapted to be placed in a horizontal position within said oven, said baffle having a vent opening, said appliance having a peripheral edge around the outside thereof and said vent opening being spaced centrally from the peripheral edge, said vent opening having a smaller crossectional dimension than the diameter of the flat body of the pizza to be heated, an upwardly extending circular side wall around the periphery of the baffle, a grill mounted above the base, said grill supporting the pizza such that the flat body of the pizza rests on the grill during use and extends completely across the center of the grill directly over the vent opening in the base in the path of gas rising therethrough and the body of the pizza thereby closing the center of the grill so that no gas can flow upwardly through the grill during use, said grill comprising an openwork formed from a plurality of spaced apart horizontally disposed elongated rod-like grill members sufficient in number and close enough in spacing to one another to provide uniform support for the center of the pizza to thereby prevent portions of the pizza body from sagging when it becomes hot, the openings in the grill between the elongated rod-like members allowing air to flow freely across and in contact with the lower surface of the pizza, leg means extending between the grill and the base for supporting the grill on the base with a predetermined spacing therebetween, said grill being unobstructed at its outer edge so that gas flowing up through the vent opening is free to flow outwardly and upwardly around the peripheral edge of the pizza, the baffle defining a shield means surrounding the vent opening and positioned below the grill to shield the peripheral edge of the pizza from infrared radiation arising from beneath the shield, the baffle being directed upwardly around the vent to provide an upwardly turned central flange at the vent opening and the vent opening being about one-half to four-fifths times the diameter of a pizza of a predetermined size whereby hot air rising through the vent opening will strike the center of the lower surface of the pizza and then spread radially outward thereby removing stagnant boundary layer air from the lower surface of the pizza to heat it uniformly.

* * * * *